July 18, 1961     S. J. WARLICK     2,992,759
COFFEE MEASURING AND DISPENSING DEVICE
Filed Nov. 26, 1958
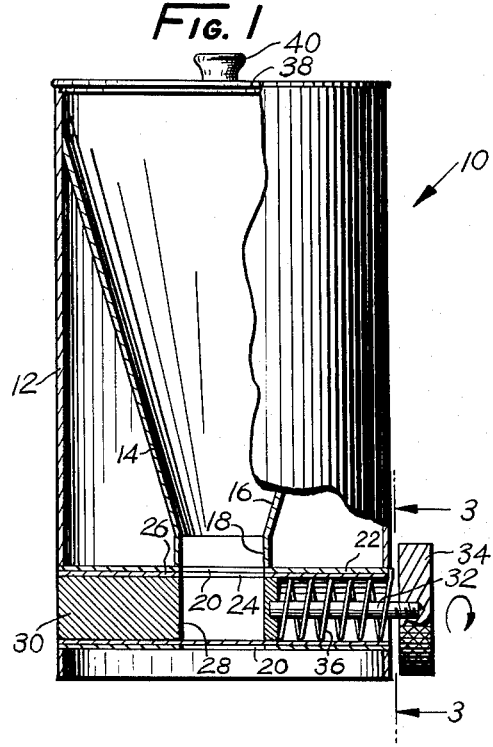
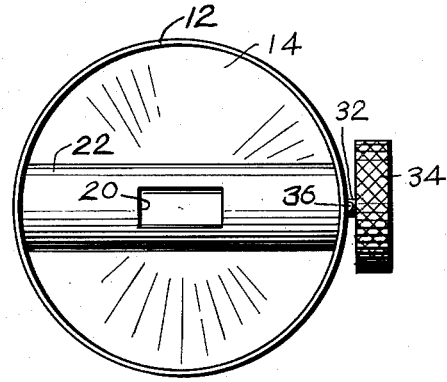
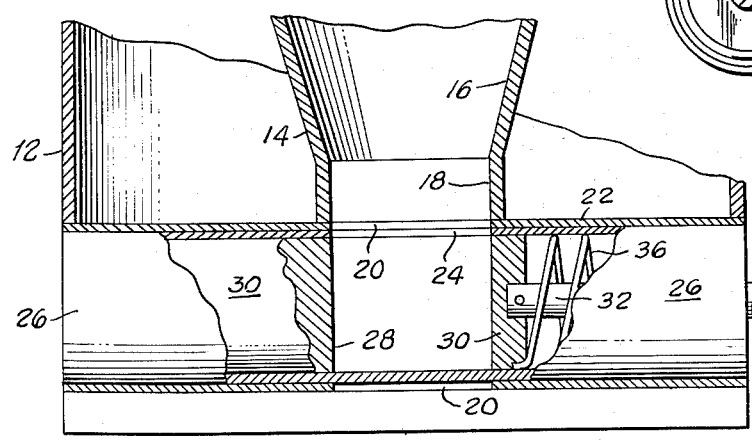
INVENTOR.
SAM. J. WARLICK
BY Joseph B. Lindecker,
ATT'Y.

United States Patent Office 2,992,759
Patented July 18, 1961

2,992,759
COFFEE MEASURING AND DISPENSING DEVICE
Sam J. Warlick, 1621 W. Maple, Enid, Okla.
Filed Nov. 26, 1958, Ser. No. 776,469
1 Claim. (Cl. 222—339)

This invention relates to dispensing devices and more particularly to a combined canister and dispenser for ground coffee. It is an object of the present invention to provide a combination ground coffee storage canister and automatic dispensing device that will precisely measure predetermined quantities of coffee for careful brewing purposes.

A further object of the present invention is to provide a coffee canister and dispenser of the above type that will automatically measure identical quantities of ground coffee during each operation thereof.

Other objects of the invention are to provide a coffee dispenser bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side elevational view, with parts broken away, of a combined coffee dispenser and canister made in accordance with the present invention;

FIGURE 2 is a top plan view of the device shown in FIGURE 1 with the closure member removed;

FIGURE 3 is an enlarged cross sectional view taken along line 3—3 of FIGURE 1; and FIGURE 4 is an enlarged cross sectional view, showing a portion of FIGURE 1, parts in full lines.

Referring now more in detail to the drawing, a combined ground coffee canister and dispenser 10 made in accordance with the present invention is shown to include a substantially cylindrical walled closure 12 having a downwardly tapering supply hopper or compartment wall 14 therewithin defining a main storage compartment 16 that forms a guide for directing ground coffee downwardly toward a chute portion 18 of rectangular transverse cross-section that opens downwardly of the canister.

A valve assembly including a hollow cylindrical tubular member 22 extends transversely across the bottom of the chute 18 and has diametrically opposite openings 20 that are in alignment with the chute 18. A cylindrical sleeve 26 is rotatably supported within the tube 22 and defines a single opening 24 of substantially the same size and shape as the openings 20 of the tube 22. A plug 30 integrally secured within the sleeve 26 has a diametrically extending slot 28 that is in alignment with the opening 24 of the sleeve 26 that defines a compartment of predetermined size for receiving a quantity of ground coffee therewithin when the opening 24 of the sleeve 26 is in alignment with the upper opening 20 of the tube 22 so as to provide communication with the interior of the main storage compartment 16.

A shaft 32 secured to the plug 30 extends outwardly of one side of the canister wall 12 and includes a handle 34 for effecting rotation thereof. A convoluted torsion spring 36 encircles the shaft 32 and is connected at opposite ends to the tube 22 and the plug 30. Thus, the spring 36 normally maintains the sleeve 26 and plug 30 in the position shown in FIGURE 1, in which position, the compartment 28 is filled with ground coffee. However, by rotating the handle 34, the torsion spring 36 is yieldable to enable the compartment 28 to be inverted so that the contents thereof may empty downwardly through the opening 24 of the sleeve 26 and the lowermost opening 20 of the tube 22. After the coffee has been discharged, the handle 34 is released, following which the torsion spring 36 will return it to its initial coffee receiving position to receive the next load of coffee for the next measuring operation.

The top of the canister 12 is provided with a removable closure 38 having a handle 40, so that the canister may be refilled with a pound or more of coffee after it has been completely emptied. As a result, it is possible to measure predetermined quantities of coffee of identical measurements at all times to provide a more perfect brew and more economical method of using such ground coffee.

While various changes may be made in the detail construction, it shall be understood that such changes shall be within the spirit and scope of the present invention as defined by the appended claim.

What I claim as new and desire to protect by Letters Patent of the United States is:

A ground coffee dispenser comprising, in combination, a vertical cylindrical receptacle consisting of vertical side walls, an open bottom and a removable top cover substantially of the same diameter as the diameter of said receptacle; a supply hopper having an open circular top portion substantially of the same diameter as the diameter of said receptacle, an open bottom portion of rectangular transverse cross-section, and a tapered wall portion therebetween; said hopper assembled vertically within said receptacle, the circular top portion of said hopper secured within and adjacent the top portion of said receptacle and closed by said removable cover on said receptacle; said supply hopper having a vertical rectangular shaped chute attached to its lower rectangular shaped open end portion; said upper portion of said hopper tapering inwardly and downwardly from its top edge portion to its lower open end connected with said vertical rectangular shaped chute through which the coffee is adapted to gravitate; a hollow cylindrical open ended tube extending transversely of said receptacle from diametrically opposite sides thereof and directly beneath said hopper and in contact with the lower end of said chute; said tube having diametrically opposite rectangular openings in alignment with the bottom end of said rectangular chute; a cylindrical sleeve rotatably supported in said tube and embodying a single rectangular opening in alignment with said openings in said plug, a cylindrical plug integrally secured within said sleeve and closing one end thereof and filling a major portion thereof; said plug embodying a rectangular type cavity of predetermined size selectively rotatable with said sleeve within said tube to a first upwardly opening ground coffee receiving position in alignment with one of said tube openings and a downwardly opening ground coffee discharge position in alignment with the other one of said tube openings; a shaft mounted within the opposite unfilled portion of said tube, one end of said shaft connected to one end of said plug; the opposite free end of said shaft extending outside said receptacle; a knob secured to the said free end of said shaft; a torsion spring mounted within said tube encircling said shaft, one end of said torsion spring being connected to one end of said plug, the opposite end of said spring connected adjacent the open end of said tube, said torsion spring normally urging said compartment in said plug in registration with the bottom of said chute; said compartment when rotated 180 degrees from its normal position, automatically discharging identical quantities of ground coffee vertically downwardly from said chute to the exterior of the receptacle and adjacent the bottom thereof.

References Cited in the file of this patent

UNITED STATES PATENTS

| | | |
|---|---|---|
| 407,650 | Estabrook et al. | July 23, 1889 |
| 1,199,502 | Schuyler et al. | Sept. 26, 1916 |
| 1,636,910 | Hardy | July 26, 1927 |
| 2,237,189 | McCormack et al. | Apr. 1, 1941 |
| 2,611,516 | Beldner | Sept. 23, 1952 |
| 2,778,542 | Ries et al. | Jan. 22, 1957 |